United States Patent [19]

Herchenbach et al.

[11] Patent Number: 4,464,077

[45] Date of Patent: Aug. 7, 1984

[54] COUPLING DEVICE FOR DRIVE SHAFTS

[75] Inventors: Paul Herchenbach, Ruppichteroth; Mathias Konrad, Troisdorf, both of Fed. Rep. of Germany

[73] Assignee: Jean Walterscheid GmbH, Lohmar, Fed. Rep. of Germany

[21] Appl. No.: 378,419

[22] Filed: May 14, 1982

[30] Foreign Application Priority Data

May 22, 1981 [DE] Fed. Rep. of Germany ....... 3120367

[51] Int. Cl.³ ............................................. F16B 7/00
[52] U.S. Cl. .................................. 403/316; 403/325; 403/328
[58] Field of Search ............... 403/328, 325, 322, 372, 403/318, 316, 317

[56] References Cited

U.S. PATENT DOCUMENTS 2,728,895 12/1955 Quackenbush et al. ........ 403/325 X
3,260,541 7/1966 Sadler et al. ............................ 403/325
4,198,080 4/1980 Carpenter ...................... 403/325 X

FOREIGN PATENT DOCUMENTS 1993808 9/1960 Fed. Rep. of Germany .
482551 12/1975 U.S.S.R. .............................. 403/325

Primary Examiner—Andrew V. Kundrat
Attorney, Agent, or Firm—Toren, McGeady and Stanger

[57] ABSTRACT

A device for locking a shaft in driving engagement within a sleeve including radially movable locking members mounted in the sleeve adapted to be held in a position to effect locked engagement with the shaft by an annular locking member operating to hold the spherical members radially in locking position relative to the sleeve. A helical spring is provided in engagement between the annular locking member and the sleeve and the spring includes first radial portions which engage the sleeve and second radial portions which engage the annular locking member in order to enable a large clearance to be provided between the sleeve and the annular locking member so that operation will not be adversely affected by accumulation of dirt.

3 Claims, 2 Drawing Figures

COUPLING DEVICE FOR DRIVE SHAFTS

The present invention relates generally to locking mechanisms for connecting together a pair of shafts which are in driving engagement with each other and more particularly to a device which may be quickly operable and which may be used, for example, for connecting the driveshaft of an agricultural implement with the power takeoff shaft of a tractor.

Devices of the type to which the present invention relates include a coupling sleeve which is adapted to have a shaft fitted in driving engagement therein with at least one radially movable member being provided in an opening in the sleeve for engaging the shaft when the radially movable member is in a radially innermost position. The locking sleeve may be biased by spring means to a position in which it holds the radially movable member in a radially innermost position for engaging the coupling sleeve on the shaft but axially movable in either direction to a position in which the blocking member or members may be permitted to move outwardly for coupling and uncoupling of the shaft and sleeve.

A coupling of the type involved is disclosed in German Gebrauchsmuster No. 19 93 808, and in the device disclosed in this reference, the locking sleeve is biased to its locking position by a pretensioned helical compression spring which at its ends engages end surfaces of s spring chamber formed in the locking sleeve as well as projections on the coupling sleeve. Because of the design of the helical spring, close tolerances must be observed between the coupling sleeve and the locking sleeve. The ends of the spring chamber and the projections on the coupling sleeve must be located close to each other to prevent the spring from jamming. On the other hand, such close tolerances operate to cause the device to be extremely sensitive to penetration by dirt and other deleterious material which is inevitable, particularly when the device is applied in agricultural equipment and exposed to the conditions normally involved therewith.

In order to reduce the likelihood of failure, the device could be sealed against penetration by dirt, but this would necessarily increase production costs and complicate the structure and operation of the device.

Accordingly, the present invention is directed toward providing a coupling device wherein sensitivity to dirt and other deleterious materials is reduced in a structure which is relatively simple and which does not require complicated and expensive design modifications.

SUMMARY OF THE INVENTION

Briefly, the present invention may be described as a coupling mechanism for connecting in driving engagement a sleeve and a shaft comprising spherical locking means, such as spherical balls or the like, mounted on the sleeve and arranged to be radially movable inwardly and outwardly thereof into and out of locking engagement between the sleeve and the shaft which may be inserted into the sleeve. An annular locking member surrounding the sleeve operates to hold the spherical locking means radially inwardly in locking position relative to the sleeve so as to engage the shaft when the shaft is inserted into the sleeve. The annular locking member is axially movable relative to the sleeve in order to release the spherical locking means to permit radial movement thereof out of locking position and spring means are operatively interposed between the sleeve and the annular locking member to apply a spring force biasing the annular locking member into position holding the spherical locking means in their locking position. In accordance with the invention, the spring means are formed with radially outermost parts in engagement with one of the sleeve or the annular locking member and with radially innermost parts thereof in engagement with the other of said sleeve and said annular locking member in order to apply an axial spring force therebetween. As a result of the configuration of the spring means, a substantial radial spacing may be provided between the sleeve and the annular locking member thereby making the device relatively insensitive to dirt or other deleterious material which may enter between the sleeve and the annular locking member.

In accordance with the invention, the spring means may comprise a generally helical spring having at least end coils thereof formed in a noncircular shape as viewed axially. The spring may be arranged so that first radial portions thereof which are radially outermost will engage with abutment surfaces formed on the annular locking member and so that second portions thereof which are located radially inwardly will engage with the sleeve. The noncircular shape of the spring will operate to provide the radially outermost and radially innermost portions for effecting the desired engagement of the spring between the sleeve and the annular locking member.

The advantage of a device in accordance with the present invention is that by designing the spring as a generally helical spring but with at least its end coils formed of a noncircular shape so as to effect engagement of the spring between the annular locking member and the sleeve, a relatively substantial difference in size may be maintained between the interior of the annular locking member and the exterior of the sleeve. Due to this difference in diameter, the device will be relatively insensitive to ingress of dirt and a gap may be provided which will enable any dirt which enters the device to fall out easily.

It is advantageous for the noncircular coils of the spring to be of a generally triangular form. This enables the greatest difference in diameter to be provided between the spring receiving part of the annular locking member and the coupling sleeve while at the same time ensuring a three-point support whereby the annular locking member will be securely retained on the coupling sleeve.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
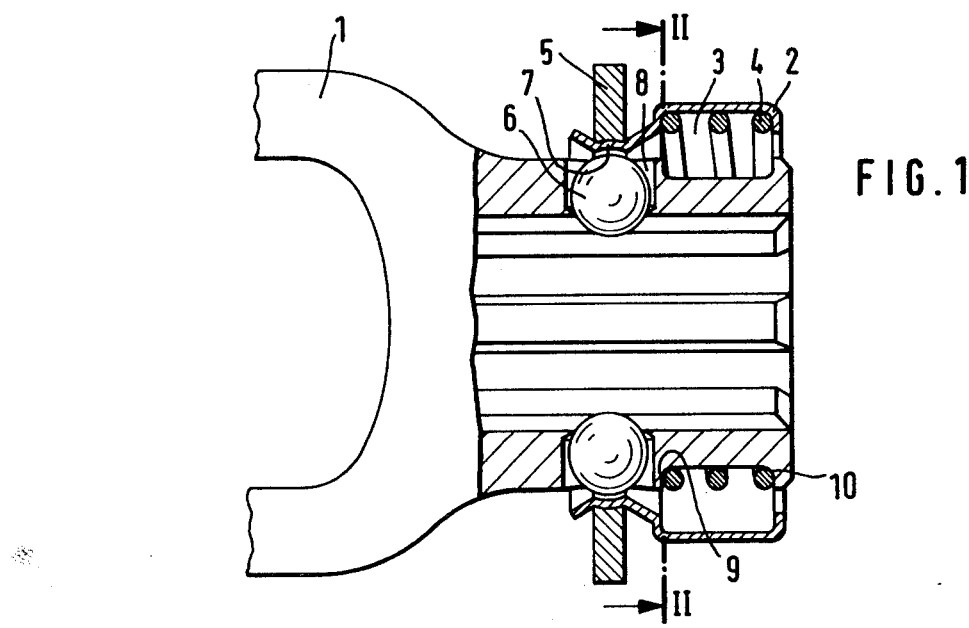
FIG. 1 is a longitudinal sectional view showing a coupling device in accordance with the present invention.

The coupling device in accordance with the present invention illustrated in the drawing is intended to form a drive-line connection whereby an agricultural machine may be driven from the power takeoff shaft of a tractor. The device of the invention is particularly shown as applied to a coupling sleeve 1 which is connected with the yoke of a universal joint (not illustrated) with the sleeve 1 being internally splined in order to receive in fitted engagement therein the power takeoff shaft of a tractor to effect a driving connection therebetween.

The coupling sleeve 1 is formed with openings 8, and spherical balls 6 which operate as locking members are mounted in the openings 8 to be radially movable therein relative to the sleeve 1. As illustrated in the drawings, the balls 6 are shown in their radially innermost position at which they would engage in a groove of a shaft in order to hold the coupling device thereon.

The balls 6 are held in the radially innermost or locking position shown in FIG. 1 by an annular locking member 2 which is formed with a locking ring 7 which engages the balls 6 when the annular locking member 2 is in the axial position shown relative to the sleeve 1.

It will be noted that the locking ring 7 is formed at its center portion with a wider diameter than portions on either axial side thereof thereby shaping the ring 7 to the outer spherical contour of the balls 6 in order to provide enhanced engagement therebetween.

If the annular locking member 2 is displaced axially in either direction, the ring 7 will move out of engagement with the balls 6 and the balls 6 will be able to move radially outwardly relative to the sleeve 1 in order to thereby be moved away from their locking position. Axial displacement of the annular locking member 2 may be effected by means of an operating ring 5 through which the member 2 may be axially actuated.

The annular locking member 2 is biased in its illustrated position by spring means which comprise a helical spring 4. As shown in the drawing, the spring 4 is of a noncircular shape as viewed axially with its outermost portions 12 arranged to abut the ends of a generally cylindrical spring chamber 3 within the annular locking member 2. The spring 4 has second, innermost portions 11 which engage annular abutments 9, 10 on the coupling sleeve 1.

As a result, the spring 4 will be compressed in the axial direction by movement of the annular locking member 2 in either axial direction from its intermediate position shown in FIG. 1. As a result of such axial movement of the annular locking member 2, the balls will be free to move radially outwardly whether the operating ring 5 is pushed when the device is being fitted to a shaft or whether it is pulled when the device is being removed.

It will be noted that as a result of the configuration of the device depicted in the drawing, there will be provided a large clearance between the coupling sleeve 1 and the annular locking member 2 so that the device will not be likely to suffer an inoperative condition as a result of dirt or other material entering the space between the annular locking member 2 and the sleeve 1.

Figure 2:
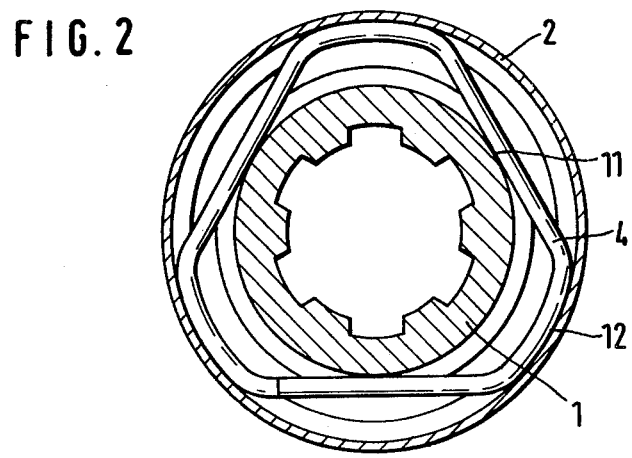
FIG. 2 is a cross-sectional view taken along the line II—II of FIG. 1.

In the embodiment illustrated, the entire spring 4 is shown as being of a noncircular configuration. However, it will be obvious that it would be sufficient for the purposes of the invention if only the axial end coils of the spring 4 were to be formed in the noncircular cross-sectional shape. Thus, if desired, merely the two axial end coils of the spring 4 may be formed in the triangular shape best seen in FIG. 2.

Furthermore, although a triangular shape of the spring coils as viewed in the axial direction is shown as the preferred embodiment of the invention, it should be understood that it would be possible for the spring coils to be formed of other noncircular shapes and preferably of a polygonal configuration.

While a specific embodiment of the invention has been shown and described in detail to illustrate the application of the inventive principles, it will be understood that the invention may be embodied otherwise without departing from such principles.

What is claimed is:

1. A coupling mechanism for connecting in driving engagement a sleeve and a shaft comprising: spherical locking means mounted on said sleeve and arranged to be movable radially inwardly and outwardly thereof into and out of locking engagement between said sleeve and said shaft; an annular locking member engaging said spherical locking means to hold said spherical locking means radially in locking position relative to said sleeve; said annular locking member being axially movable relative to said sleeve to release said spherical locking means to permit radial movement thereof out of said locking position; and spring means operatively interposed between said sleeve and said annular locking member to apply a spring force therebetween biasing said annular locking member into position holding said spherical locking means in said locking position; said spring means being formed with first radial parts thereof in engagement with said sleeve and with second radial parts thereof in engagement with said annular locking member, said first and said second radial parts being radially displaced relative to each other; wherein said annular locking member extends about said sleeve, wherein said first radial parts of said spring means are in engagement with abutment means on said sleeve, and wherein said second radial parts of said spring means are in engagement with abutment means on said annular locking member, said first radial parts of said spring means being located radially outwardly of said second radial parts thereof, said spring means comprising a helical spring having at least the axial end coils thereof formed with a polygonal configuration with the radially outermost parts of said polygonal configuration being in engagement with said annular locking member and with the radially innermost parts of said polygonal configuration being in engagement with said sleeve.

2. A mechanism according to claim 1 wherein said polygonal configuration comprises a triangular shape.

3. A mechanism according to claim 2 wherein said helical spring is formed with said polygonal configuration over the entire length thereof.

* * * * *